(12) United States Patent
Packebush (10) Patent No.: US 6,959,660 B1
(45) Date of Patent: Nov. 1, 2005

(54) PERSONAL WATERCRAFT AND ACCESS OPENING SEAL

(75) Inventor: Darin R. Packebush, Spirit Lake, IA (US)

(73) Assignee: Polaris Industries Inc., Medina, MN (US)

( * ) Notice: Subject to any disclaimer, the term of this patent is extended or adjusted under 35 U.S.C. 154(b) by 178 days.

(21) Appl. No.: 10/626,936

(22) Filed: Jul. 25, 2003

(51) Int. Cl.$^7$ ................................................ B63C 7/00
(52) U.S. Cl. ................................... 114/55.53; 277/641
(58) Field of Search ............................ 114/55.51, 55.53, 114/201 R; 277/637, 641, 642, 645; 137/360

(56) References Cited

U.S. PATENT DOCUMENTS

| | | | |
|---|---|---|---|
| 3,130,852 A | 4/1964 | Cook ............................ 43/55 |
| 3,352,447 A | 11/1967 | Hahn ........................ 220/323 |
| 4,056,211 A | 11/1977 | Zumwalt ............... 220/592.06 |
| 4,311,317 A | 1/1982 | Bartels ....................... 220/304 |
| 4,385,580 A | 5/1983 | Davidson ............... 114/201 R |
| 4,448,430 A | * 5/1984 | Bright ........................ 277/642 |
| 4,706,702 A | * 11/1987 | Grasseschi .................. 137/360 |
| 4,756,332 A | * 7/1988 | Grasseschi .................. 137/360 |
| 5,076,188 A | 12/1991 | Burroughs ............. 114/201 R |
| 5,096,208 A | * 3/1992 | Westberg .................... 277/641 |
| 5,135,239 A | 8/1992 | Kato et al. .................. 277/645 |
| 5,256,092 A | 10/1993 | Jones .......................... 440/87 |
| 5,462,292 A | * 10/1995 | Yamane ...................... 277/642 |
| 5,678,827 A | 10/1997 | Burian et al. ............... 277/637 |
| 6,276,290 B1 | 8/2001 | Yamada et al. .......... 114/55.51 |
| 6,553,928 B2 | 4/2003 | Yamada et al. .......... 114/55.51 |
| 6,722,301 B2 | * 4/2004 | Nagata et al. ........... 114/55.53 |
| 2001/0047744 A1 | 12/2001 | Aselton et al. ............ 114/55.5 |
| 2002/0053310 A1 | 5/2002 | Ibata et al. .............. 114/55.53 |
| 2003/0061975 A1 | 4/2003 | Nadeau et al. ........... 114/55.53 |

* cited by examiner

Primary Examiner—Lars A. Olson
(74) Attorney, Agent, or Firm—Fredrikson & Byron, PA (57) ABSTRACT

Access opening seal for attachment to the lip of an access opening having an exposed edge, particularly an access opening of a personal watercraft. The seal includes a top portion and a side portion and may further include a bottom portion with the side portion being between the top and bottom portions. The seal portions cooperate to define an interior surface and exterior surfaces. The seal may be affixed to the lip of an access opening with the interior surface of the top portion abutting the outer wall of a personal watercraft top deck or other structure and with the side portion positioned along and covering the exposed edge. Where a bottom portion is provided, the bottom portion abuts the inner wall of the top deck or other structure. The seal may be formed of a polymeric or other material and cooperates with a storage compartment and/or cover to form a watertight seal. The seal may be affixed to the lip of the access opening, with an adhesive or mechanical fastener.

32 Claims, 10 Drawing Sheets

PERSONAL WATERCRAFT AND ACCESS OPENING SEAL

FIELD OF THE INVENTION

The present invention relates generally to personal watercraft. Specifically, the present invention relates to a seal for access openings, and more specifically to the seal as affixed to an access opening of personal watercraft.

BACKGROUND OF THE INVENTION

Personal watercraft (PWC or watercraft) have become increasingly popular in recent years. A personal watercraft, also known as a "jet ski" typically has a bottom hull, handle bars for steering, a tunnel within the bottom hull, a jet pump located within the bottom tunnel, and an engine within the hull under the top deck for driving the jet pump. The jet pump typically pulls in water from the front of the tunnel under the boat, and discharges the water at high velocity through a steerable nozzle at the rear of the boat. The handlebars are typically coupled to the nozzle, which is the steering mechanism for the personal watercraft. The watercraft commonly has a straddle-type seat and foot wells disposed on either side of the seat.

Personal watercraft typically have a top deck affixed to a bottom hull. The PWC has a shroud mounted in front of the driver on top of the top deck to house the steering column and some instruments. A front portion of the top deck includes a hinged cover or hood. The hood is hingedly mounted to the personal watercraft top deck at the front, rather than at the rear, as in an automobile. The underside of the hood can include a gasket or a grommet that attempts to provide a watertight seal between the hood and the top deck. The hood typically covers either an access opening such as a storage compartment or bin or an engine access port. The watercraft may be provided with additional access openings, supporting other storage compartments or allowing access to the interior of the PWC through the top deck. PWCs may be further provided with storage compartment covers, both hinged and non-hinged, for such additional access openings.

Personal watercraft decks and hulls are typically formed of fiberglass with access openings being cut into or through the deck wall. Whether formed of fiberglass or other material, access openings cut into the decks usually are left unfinished, presenting roughly machined or irregular edges or edge surfaces. Contact with fiberglass particles from the access opening edges can accumulate on the skin causing irritation, itching, temporary redness and other physical discomfort. There is also the potential for similar discomforts and scratches or cuts from contact with roughly machined edges of access openings regardless of the material in to which they are formed or cut.

Previously, access openings have been provided with seals affixed to and around the lip of the access openings which may support a storage compartment. The access opening seal in cooperation with storage compartment and/or the gasket or grommet of the hood or a compartment cover attempts to form a watertight seal. Seals so affixed have left the access opening edge exposed and therefore have not provided protection against contact with the exposed edge when a person reaches into an access opening. Exposed edges of access openings remains a problem in the watercraft industry, particularly with materials such as fiberglass.

It would be desirable to provide a seal that covers the exposed edge of an access opening, thereby protecting a person from contact with the access opening edge. It would be even more desirable to provide a seal that additionally forms a watertight seal in cooperation with a storage compartment supported thereon, a hood, a storage compartment cover or combinations thereof.

SUMMARY OF THE INVENTION

The present invention provides a jet propelled personal watercraft including a hull, the hull having a bottom hull and a top deck secured over the bottom hull, the hull defining an engine compartment sized to contain an internal combustion engine for powering a jet propulsion unit. The personal watercraft also includes a jet propulsion unit and a steerable water discharge nozzle. The top deck has an inner wall and an outer wall and can have a raised, longitudinally extending seat adapted to accommodate an operator in straddle fashion. The top deck of the personal watercraft further includes at least one access opening with a lip and an exposed edge. The personal watercraft includes an access opening seal affixed to the access opening. The personal watercraft may further include a hood having at least one electrical instrument disposed on a rear portion of the hood in front of the driver. The personal watercraft may also include an access opening cover; the cover may be incorporated into the hood. Further, the personal watercraft also includes a hinge assembly comprising a hinge having a hinge top portion for mounting to the hood and a hinge bottom portion for mounting to the top deck. The hinge bottom portion can be pivotally coupled to the hinge top portion about a hinge pivot.

In an embodiment, the access opening seal is an annular gasket sized and configured to conform to the shape of the opening. The gasket has a top portion and a side portion and the two portions cooperate to define an exterior surface and an interior surface. The top portion of the gasket is positioned around and attached to the lip of the opening with the interior surface of the top portion abutting the outer wall and the side portion positioned along and covering the exposed edge. The seal may optionally include an adhesive strip attached to the interior surface of the gasket portion.

In another embodiment, the seal or gasket further includes a bottom portion that is substantially parallel to the top portion. In this embodiment, the side portion is located between the top and bottom portions. The three portions cooperate to define an exterior surface and an interior surface and the interior surface of the bottom portion abuts the inner wall when the seal is affixed to the top deck. The seal or gasket may have a generally L-shaped, U-shaped or J-shaped cross-section.

In an embodiment with an L-shaped seal or gasket, the top and side portions are disposed at approximately a right angle relative to each other when the seal or gasket is viewed in cross-section. The side portion of this embodiment is linear. In another embodiment, the side portion may be arced or curved.

In another embodiment, the seal has a U-shaped cross-section. In this embodiment, the top portion and the side portion are disposed at approximately a right angle relative to each other and the bottom potion is disposed at approximately a right angle relative to the side portion. The top portion and bottom portions are generally parallel and of relatively equal length. In another embodiment, the side portion of the U-shaped seal is arced or curved and top and bottom portions are generally parallel and of relatively equal length. In yet another embodiment, the seal is J-shaped and the top and bottom portions are not of equal or relatively equal length.

In the various embodiments, the seal may include an engaging structure formed in or affixed to the exterior surface of the top portion. The seal may be affixed to the outer wall of the or both the inner and outer wall of the lip with an attachment means, including but not limited to adhesives, adhesive strips or mechanical fasteners. The seal or gasket in the various embodiments of the invention is formed of a polymeric material. The polymeric material preferably is flexible and resilient and generally of sufficient durometer to form a watertight seal under either the weight of a storage compartment disposed in the opening or of the hood or a cover closed over the access opening, or the combined weight of the storage compartment and closed hood or cover. More preferably, the polymeric material has a durometer ranging between 30–80.

DETAILED DESCRIPTION OF THE PREFERRED EMBODIMENTS

The following detailed description should be read with reference to the drawings, in which like elements in different drawings are numbered identically. The drawings, which are not necessarily to scale, depict selected embodiments and are not intended to limit the scope of the invention.

Figure 1:
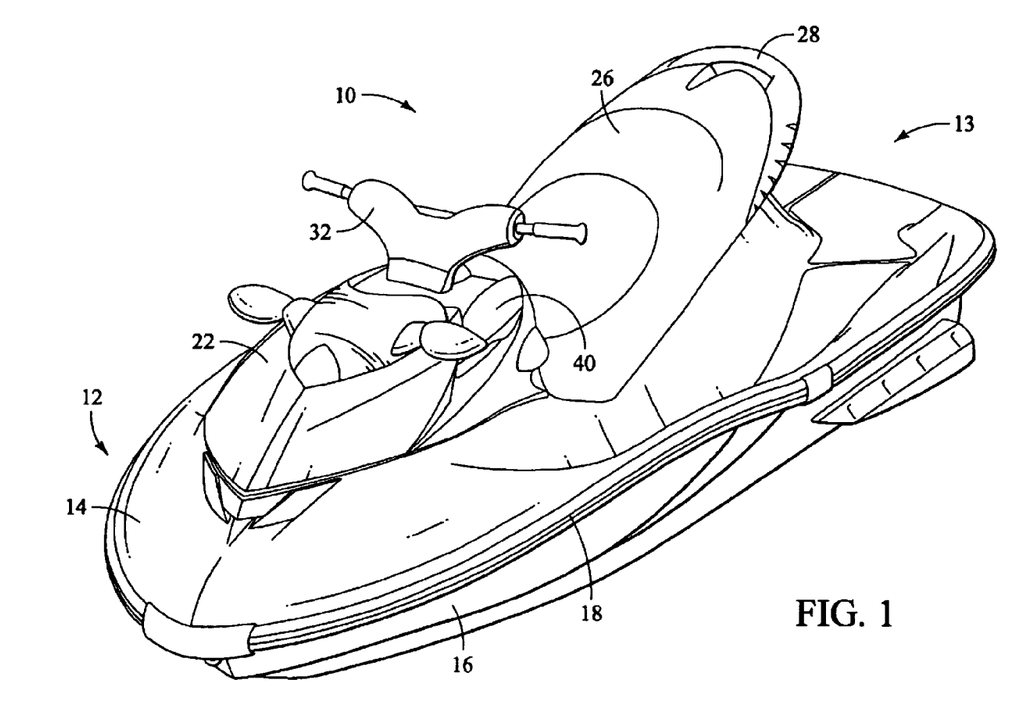
FIG. 1 is a perspective view of a watercraft.
Figure 3:
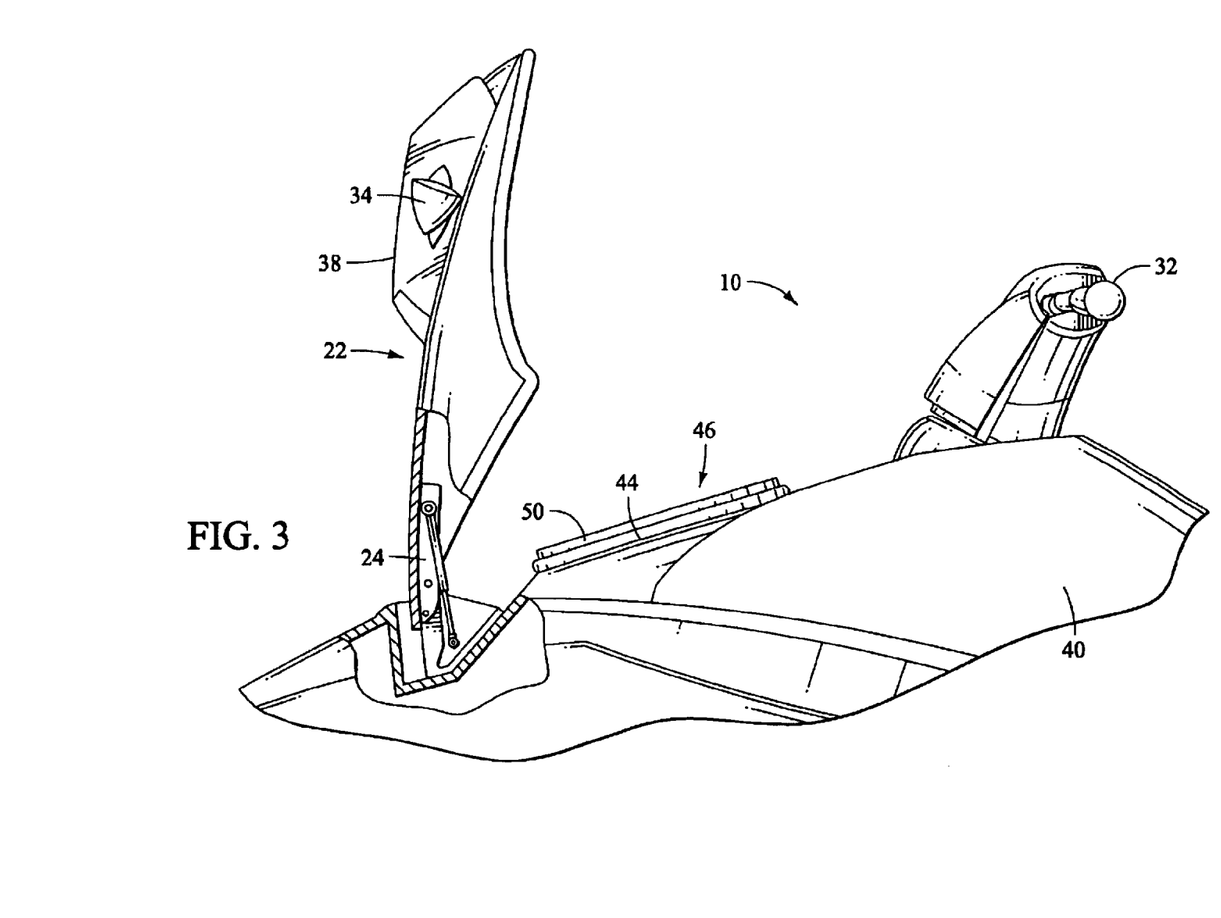
FIG. 3 is partial side view of a watercraft with hood in raised position.

FIG. 1 illustrates a personal watercraft 10 having generally a front or bow 12 and a rear or stern 13. Personal watercraft 10 includes a top deck 14 secured to a bottom hull 16 along an overlapping portion covered with a rub rail 18 in the embodiment illustrated, forming a hull. A hood 22, which may include a gasket or grommet or incorporate an access opening cover (not shown), may also be seen joined to top deck 14 at a hinged front hood portion 24 as seen in FIG. 3. The hull formed by the bottom hull 16 and top deck 14 define a compartment sized to contain an internal combustion engine (not shown) for powering the watercraft, and may also include one or more storage compartments, depending upon the size and configuration of the watercraft. Top deck 14 also has a raised, longitudinally extending seat 26 adapted to accommodate one or more riders seated in straddle fashion on the seat 26. A grab handle 28 is disposed transversely across the rear of the seat 26. Typically, mounted in a tunnel at the bottom rear portion of the watercraft is a jet propulsion unit that includes a steerable water discharge nozzle (not shown) that is operatively connected to a set of handlebars 32 to facilitate steering of the watercraft by the operator. Handlebars 32 typically mount through a top portion of a shroud 40. The connection between handlebars 32 and the discharge nozzle may be of any suitable type, and typically includes mechanical linkages including a control cable. If desired, an electronic connection could also be utilized.

Figure 2:
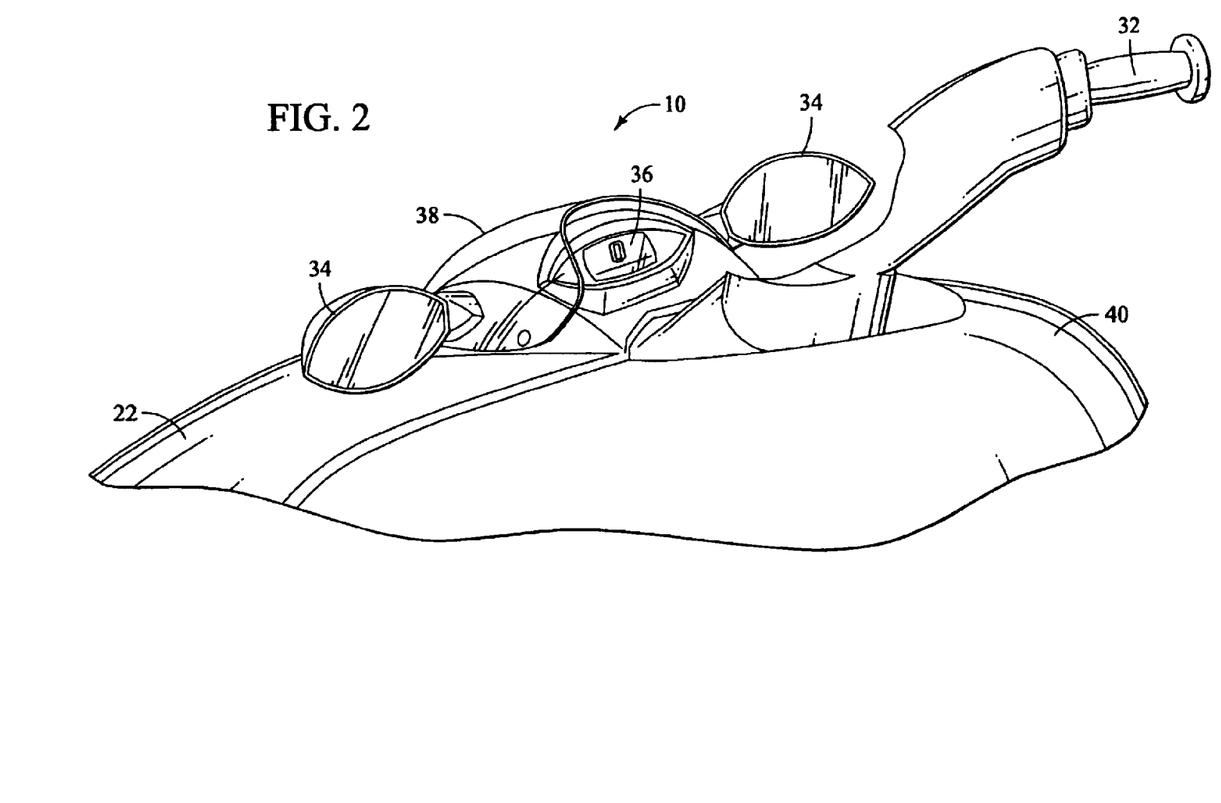
FIG. 2 is a partial perspective side view of a watercraft from the rear of the handlebars.

FIG. 2 illustrates personal watercraft 10 from the side and to the rear of handlebars 32. Twin rearview mirrors 34 may be seen, as may an instrument panel or gauge 36, mounted on hood 22. An instrument windscreen 38 may be seen partially covering instrument panel 36.

FIG. 3 illustrates personal watercraft 10, with hood 22 in the raised, open position and hinged front portion 24 shown in cutaway. Hood 22 may be seen to close about a seal 44 that is affixed to and around access opening 46 in the top deck 14, with storage compartment 50 disposed therein.

Figure 4:
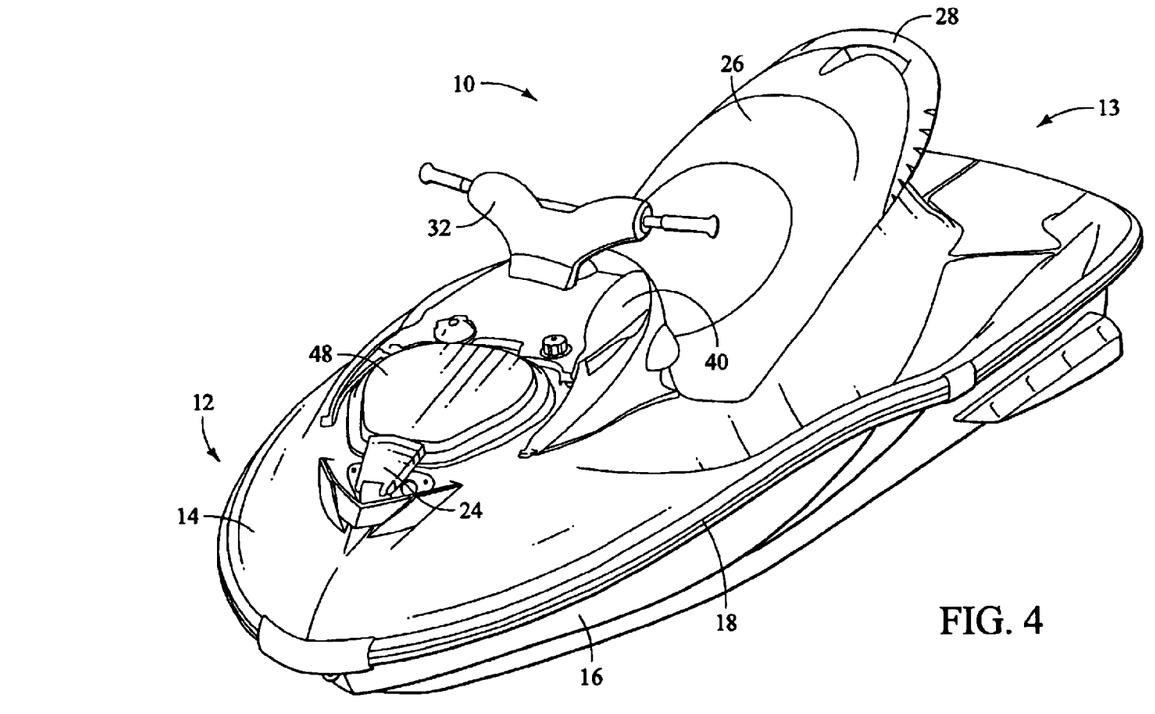
FIG. 4 is a perspective view of a watercraft with the hood removed.

Personal watercraft 10 is illustrated in FIG. 4 with hood 22 removed, revealing, in closed position, an example of an accessing opening cover 48 that may be beneath or incorporated into the hood 22. Access openings may be cut into and positioned at different locations of the top deck 14 and may be also provided with a cover 48.

Figure 5:
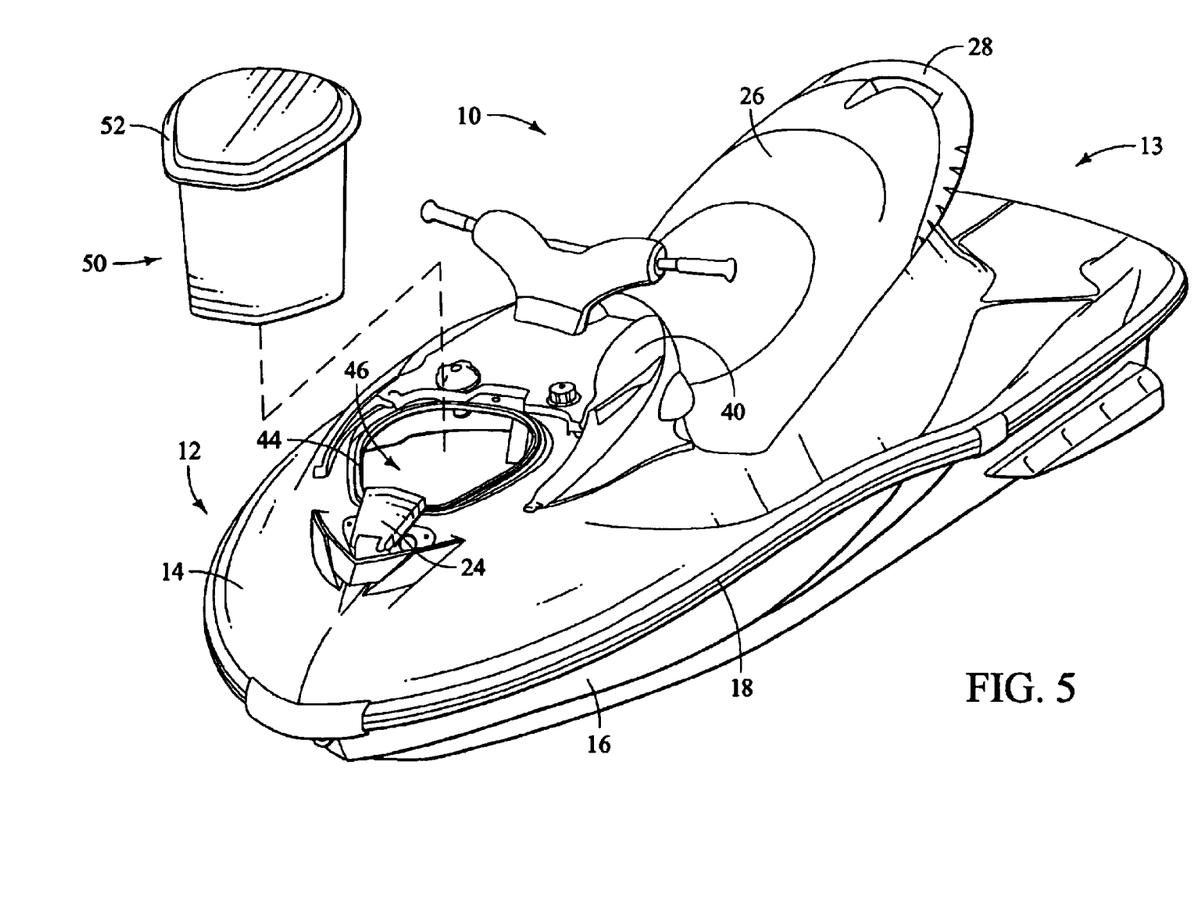
FIG. 5 is a perspective view of a watercraft with the hood removed and the storage compartment in an exploded state.

A personal watercraft 10 is illustrated in FIG. 5 with the cover also removed and storage compartment 50 in exploded view. With reference to FIG. 5, storage compartment 50, having a flange 52, may be disposed in access opening 46. When disposed in access opening 46, storage compartment 50 is supported by flange 52 which rests upon seal 44. The storage compartment 50 is maintained in a watertight condition by hood 22 or access opening cover 48 and seal 44.

Figure 6:
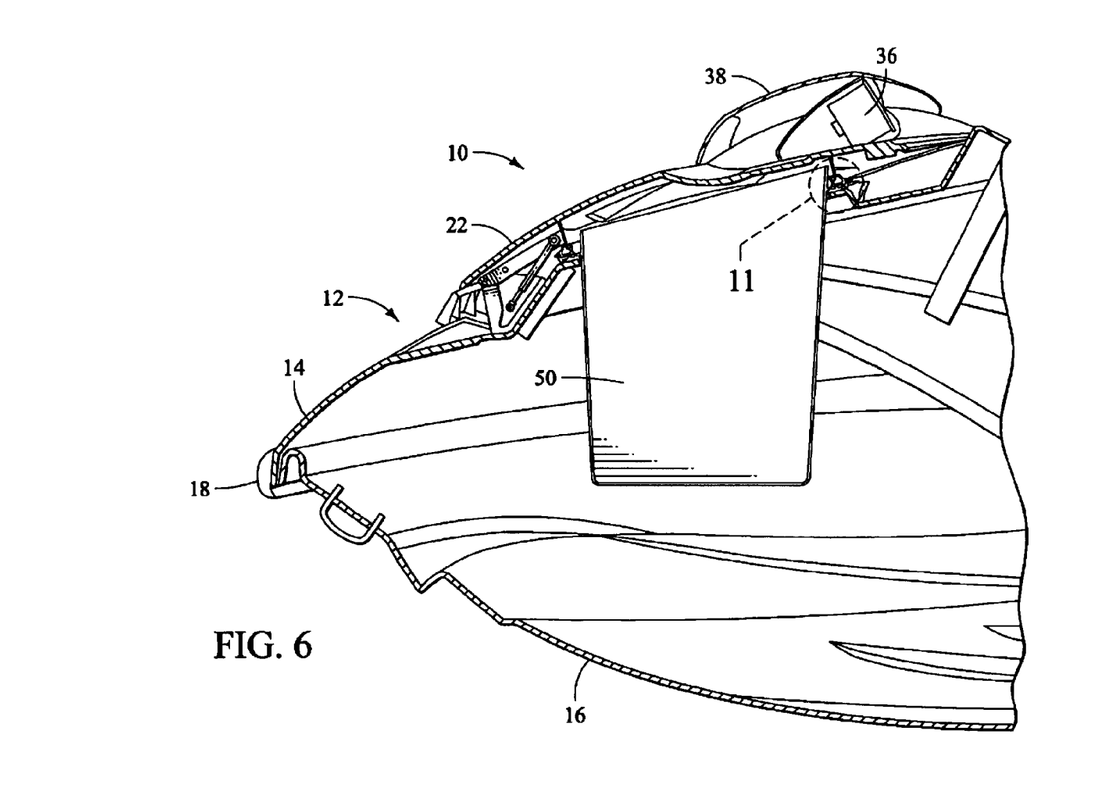
FIG. 6 is a cross-sectional side view of the bow of a watercraft with encircled detail 11.
Figure 12:
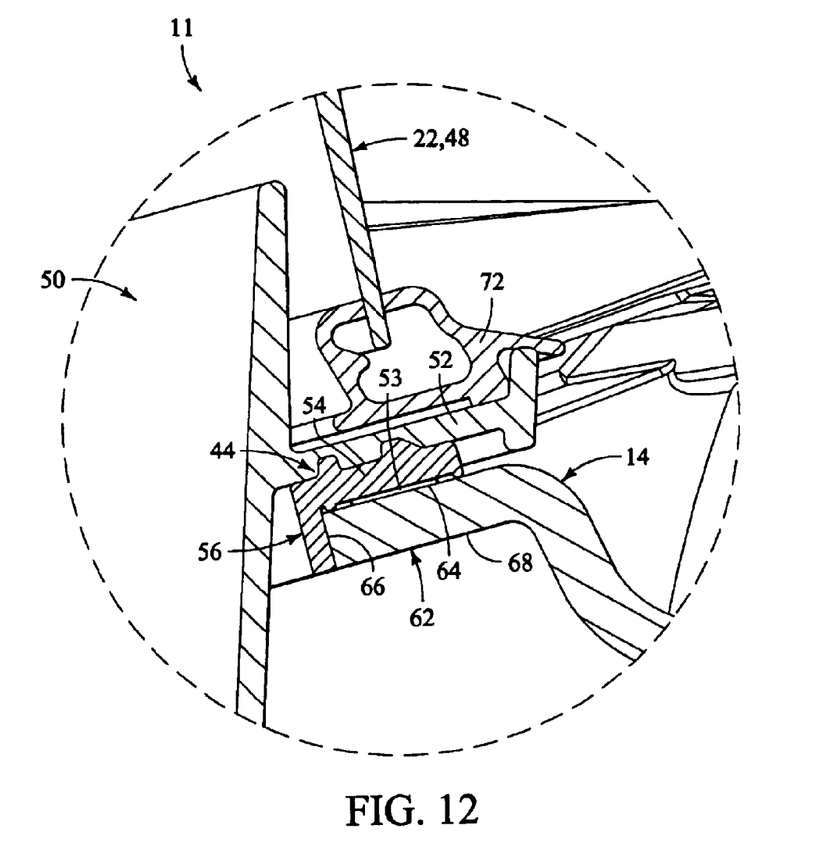
FIG. 12 is a cross-sectional, side detailed view of hood-storage compartment-seal interface of FIG. 6.

FIG. 6 illustrates a bow section of personal watercraft 10 in cross-section with storage compartment 50 resting on seal 44 and covered by hood 22. The positioning of the seal and relation to other structures of personal watercraft 10 can be understood with reference to FIG. 12 showing in expanded view encircled detail 11 of FIG. 6 as discussed later herein below.

With general reference to FIGS. 5 and 7–11, access opening 46 may be cut into or formed in the wall of the top deck of personal watercraft 10 or in other structure or article. Around the periphery of the access opening 46 is a lip 62 and just within the opening 46 is the exposed edge 66 of the access opening 46. The seal 44 is sized and configured to conform to the shape of the access opening 46. When installed, the seal 44 is positioned around and affixed to the lip 62 of the access opening and covers the exposed edge 66 of the opening 46. Seal 44 is affixed to the top deck outer wall 64.

Figure 7:
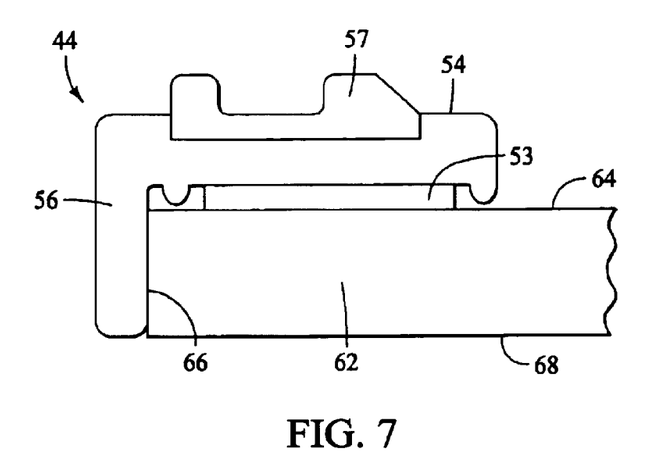
FIG. 7 a partial, cross-sectional view of an embodiment of a seal of the invention.
Figure 8:
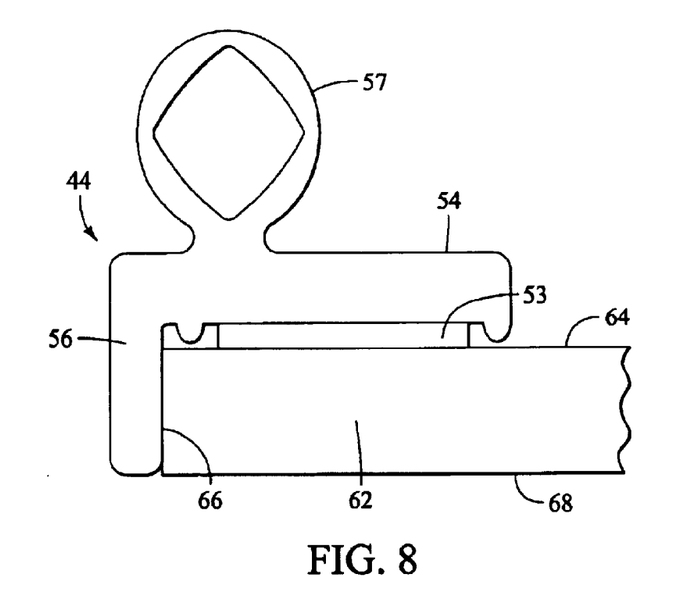
FIG. 8 is a partial, cross-sectional view of an embodiment of a seal of the invention.
Figure 9:
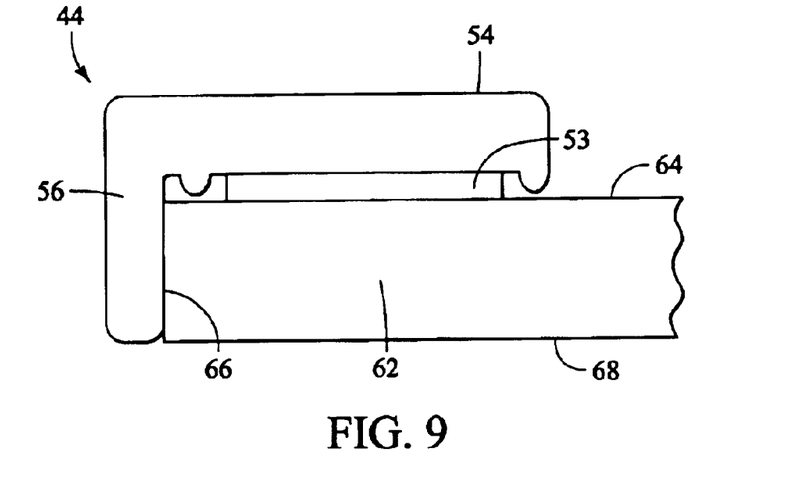
FIG. 9 is a partial, cross-sectional view of an embodiment of a seal of the invention.

Seal 44 is an annular gasket which may generally be viewed in cross-section as having a top portion 54 and a side portion 56 which cooperate to define an exterior surface and an interior surface. Referring to FIGS. 7–9, the top portion 54 of the gasket is attached to the lip 62 of the opening with the interior surface of the top portion abutting the outer wall 64 and the side portion 56 positioned along and covering the exposed edge 66.

The seal 44 may optionally include an attachment means, such as an adhesive strip 53, attached to the interior surface of the top portion 54. The attachment means or adhesive strip 53 is utilized to affix the seal to the top deck outer wall 64. Alternatively, the seal 44 may be provided without an attachment means attached to the interior surface of top portion 54. In which case, the seal 44 may be affixed to the top deck 14 using a suitable adhesive applied either to the interior surface of the seal 44 or around lip 62 of the access opening 46 prior to installation of seal 44, or a suitable mechanical fastener may be used.

The seal 44 may be provided in different configurations; and when viewed in partial cross-section, the seal 44 may be generally L-shaped, U-shaped or J-shaped. In the embodiments illustrated in FIGS. 7–9, the seal 44 is generally L-shaped when viewed in cross-section. The top portion 54 and the side portion 56 are disposed at approximately a right angle relative to each other when the gasket is viewed in cross-section. Typically, the top portion 54 will be longer than the side portion 56 as illustrated in FIGS. 7–9. However, the relative lengths of the top and side portions 54, 56 may be the same or different depending upon the width lip 62 of the top deck wall and the amount of available lip surface surrounding the access opening 46. Preferably, the side portion 56 is of sufficient length to cover the entire exposed edge 66 and the top portion 54 is of sufficient length for seal 44 to be securely affixed to the lip 62 of access opening 46. A longer side portion 56 may be utilized to provide, if desired, additional lateral stability to a bucket or storage compartment 50 disposed in access opening 46.

Figure 10:
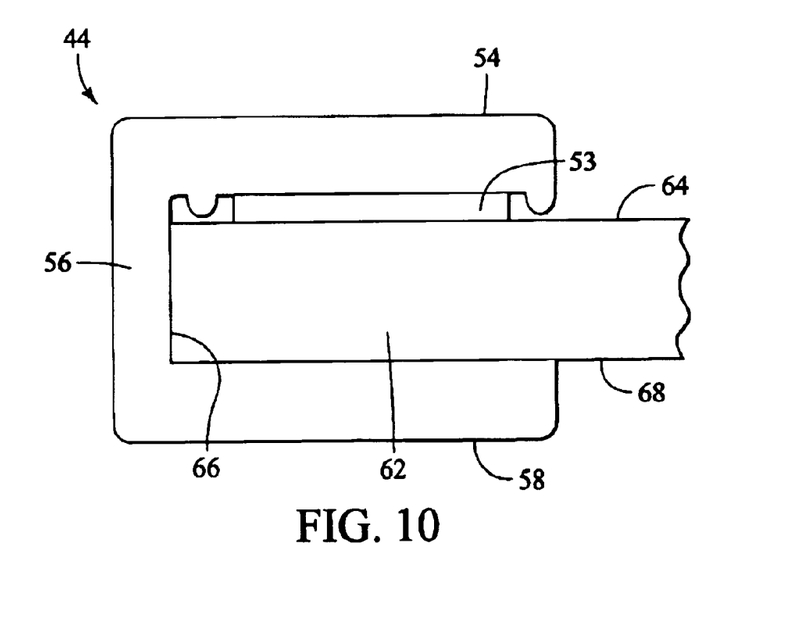
FIG. 10 is a partial, cross-sectional view of an embodiment of a seal of the invention.
Figure 11:
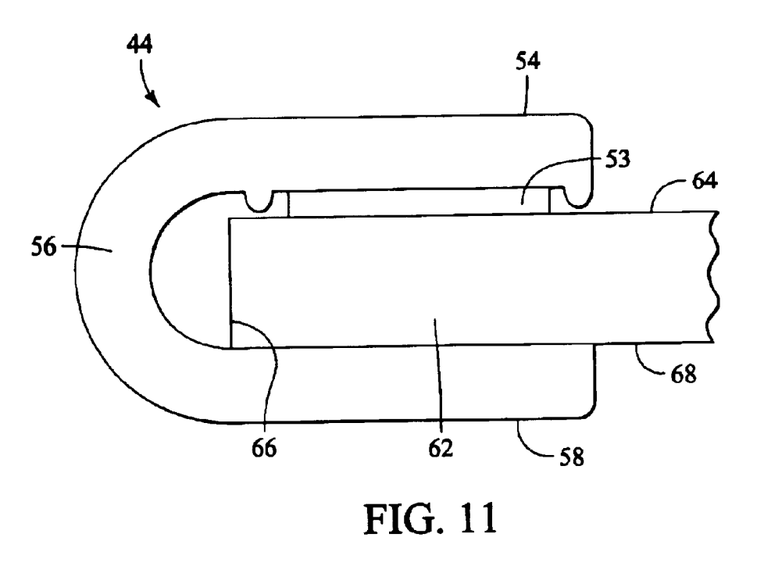
FIG. 11 is a partial, cross-sectional view of an embodiment of a seal of the invention.

As illustrated in FIGS. 10 and 11, in yet other embodiments, the seal 44 may further include a bottom portion 58, with the side portion 56 located or positioned between the top and the bottom portions 54, 58. As with the embodiments of FIGS. 7–9, the three portions cooperate to define an exterior surface and an interior surface. The embodiments illustrated in FIGS. 10 and 11 are positioned and affixed in substantially the same manner as the embodiments of FIGS. 7–9 but with the bottom portion 58 abutting the interior wall 68 of top deck or other structure. The seal 44 illustrated in FIGS. 10 and 11 may be viewed in partial cross-section as being generally U-shaped. Though not shown, the seal 44 of FIGS. 10 and 11 may optionally include an adhesive strip on the interior surface of the bottom portion 58 if additionally adhesion is desired or required. Also, the bottom portion 58 may be adhered and secured to the inner wall 68 of lip 62 of top deck 14 or other structure with an attachment means, such as an adhesive, adhesive strip or mechanical fastener, in substantially the same manner as the top portion 54 is adhered and secured to the outer wall 64 of lip 62. The bottom portion 58 may be the same or different length relative to either the top portion 54, the side portion 56 or both. When the top and bottom portions 54, 58 are of relative equal length, the seal 44 may be said to be generally U-shaped and when the two portions 54, 58 are of different length, the seal 44 may be said to be generally J-shaped.

Whether the seal 44 is generally L-shaped, U-shaped or J-shaped, the side portion 56 may be linear as shown in FIGS. 7–10 or arced or curved as shown in FIG. 11. Further, the top portion 54 and bottom portion 58 may be generally parallel. In another embodiment, the seal 44 is not affixed by an attachment means; rather, the side portion 56 is sized so that the interior surfaces of top and bottom portions 54, 58 are spaced apart a distance at least equal to the thickness of the top deck wall or lip 62 or edge 66 so as to closely conform to the lip 62 of the access opening 46 without need for an adhesive or fastener. If the surface of the wall or lip 62 abutting the top and/or bottom portions 54, 58 tends to curve when moving away from the edge 66 of the access opening 46, the top and bottom portions, 54, 56 may be similarly curved in order to conform to the curvature of the wall or lip 62.

Seal 44 may be formed of any of a variety of suitable materials known to those skilled in the art, such as rubber, gum, silicon, felt or even cork, and may be of any durometer. In order to conform to the shape of an access opening 46 or curvature of the wall or lip 62, the seal 44 is preferably formed of a polymeric material. More preferably, the seal 44 is flexible and resilient. Generally, the seal 44 should be of sufficient durometer so as to form a watertight seal either under the weight of the storage compartment 50 supported thereon and/or of the hood 22 or cover 48 when in the closed position. Polymeric materials having durometer ranging between 30–80 have been found to be particularly preferred. One polymeric material found to be particularly well suited is ethylene propylene diene methylene terpolymer of durometer ranging between 30–80.

Referring to FIGS. 7 and 8, seal 44 may further include an engaging structure 57 which may be formed in and an integral part of top portion 54 or separately formed and attached to top portion 54. The engaging structure 57 have a number of different configurations as is illustrated in the two different styles of engaging structures 57 shown in FIGS. 7 and 8. Engaging structure 57 may be of the same or different durometer as the rest of the seal 44 and may be shaped to conform to the hood 22, cover 48, a gasket or grommet provided on the underside of hood 22 or cover 48, or storage compartment flange 52. As illustrated in FIGS. 9–11, an engaging structure 57 is not required for all embodiments, particularly only when the durometer of the seal material is sufficiently high.

Turning to FIG. 12, detail 11 of FIG. 6 is shown in expanded view. Seal 44, similar to the embodiment depicted in FIG. 7, is shown affixed to lip 62 of top deck 14. Seal 44 is adhered to the lip 62 by adhesive strip 53. Side portion 56 covers and abuts exposed edge 66. The top portion 54 extends between the lip 62 and flange 52 of storage compartment 50. A portion of hood 22 or cover 48 is shown in closed position with hood or cover seal 72 resting on flange 52 of storage compartment 50. The weight of the hood 22 or cover 48 along with that of storage compartment 50 compress the seals 44 and 72 to provide a water tight seal. When the access opening 46 is not provided with a storage compartment, a water tight seal may be formed by the weight of the hood 22 or cover 48 compressing seal 44. In FIGS. 7 and 8, seal 44 includes an engaging structure 57 which may be seen to conform to the shape of the underside of flange 52 and/or to be compressible. In the absence of a storage compartment, the engaging structure 57 may be configured to conform to the shape of the hood 22 or cover 48. And, as previously noted, a watertight seal may be formed without need for engaging structure 57 if seal 44 is formed of a polymeric material of preferred durometer.

While exemplary embodiments of this invention have been illustrated and described, it should be understood that embodiments shown in drawings and described above are merely for illustrative purposes, and are not intended to limit scope of the invention as defined in the appended claims. Further, it will be understood that various changes, adaptations, and modifications might be made without departing from the spirit of the invention and the scope of the appended claims.

What is claimed is:

1. A jet propelled watercraft, comprising:
    a hull including a bottom hull and a top deck secured over the bottom hull, the hull defining an engine compartment sized to contain an internal combustion engine for powering a jet propulsion unit, the jet propulsion unit including a steerable water discharge nozzle, the top deck having an inner wall, an outer wall, a raised, longitudinally extending seat adapted to accommodate an operator in straddle fashion and at least one access opening therein, the access opening having a lip and an exposed edge; and
    an access opening seal affixed to the opening, the access opening seal comprising an annular gasket sized and configured to conform to the shape of the opening, the gasket having a top portion and a side portion, the two portions cooperating to define an exterior surface and an interior surface, the top portion of the gasket being positioned around and attached to the lip of the opening with the interior surface of the top portion abutting the outer wall and the side portion positioned along and covering the exposed edge; and
    a storage compartment disposed in the access opening, the storage compartment having a flange that rests on the gasket, wherein a water tight seal is formed when the compartment is disposed in the access opening; and optionally an attachment means attached to the interior surface of the gasket.

2. The watercraft of claim 1, wherein the gasket has a bottom portion that is substantially parallel to the top portion with the side portion being located between the top and bottom portions, the three portions cooperating to define an exterior surface and an interior surface, and the interior surface of the bottom portion abutting the inner wall.

3. The watercraft of claim 1, wherein the gasket has a generally L-shaped cross-section.

4. The watercraft of claim 1, wherein the two portions are disposed at approximately a right angle relative to each other when the gasket is viewed in cross-section.

5. The watercraft of claim 1, wherein the side portion is arced.

6. The watercraft of claim 2, wherein the top portion and the side portion are disposed at approximately a right angle relative to each other and the bottom potion is disposed at approximately a right angle relative to the side portion.

7. The watercraft of claim 2, wherein the side portion is arced.

8. The watercraft of claim 2, wherein the gasket when viewed in cross is J-shaped or U-shaped.

9. The watercraft of claim 1 or claim 2, wherein the gasket further comprises an attachment means, the attachment means being an adhesive or an adhesive strip attached to the interior surface of the top portion.

10. The watercraft of claim 1 or claim 2, wherein the gasket is adhered to the access opening lip with an adhesive, an adhesive strip or a mechanical fastener.

11. The watercraft of claim 1 or claim 2, wherein the gasket is formed of a polymeric material.

12. The watercraft of claim 1 or claim 2, wherein the gasket is formed of a polymeric material having a durometer ranging between 30–80.

13. The watercraft of claim 1 or claim 2, wherein the gasket if formed of ethylene propylene diene methylene terpolymer having a durometer ranging between 30–80.

14. The watercraft of claim 1 or claim 2, further comprising an access opening cover, wherein a watertight seal is formed when the cover is in a closed position.

15. The watercraft of claim 1 or claim 2, further comprising an access opening cover, wherein the gasket has an engaging structure formed in or affixed to the exterior surface of the top portion and a watertight seal is formed when the cover is in a closed position.

16. The watercraft of claim 1 or claim 2, further comprising an access opening cover and a cover seal that is positioned between the cover and the flange when the cover is in a closed position, wherein a watertight seal is formed when the cover is in a closed position.

17. The watercraft of claim 1 or claim 2, further comprising an access opening cover and a cover seal that is positioned between the cover and the flange when the cover is in a closed position, and an engaging structure formed in or affixed to the exterior surface of the top portion, wherein a watertight seal is formed when the cover is in a closed position.

18. An access opening seal for an access opening formed in an article, device, or structure having an inner wall and an outer wall and the access opening having an exposed edge and a lip, comprising:

an annular gasket sized and configured to conform to the shape of the access opening, the gasket having a top portion and a side portion, the two portions cooperating to define an exterior surface and an interior surface, the gasket being further configured to form a water tight seal when a storage compartment having a flange is disposed in the access opening with the flange resting on the gasket; wherein, when the seal is affixed to the access opening, the top portion of the gasket is positioned around and attached to the lip of the opening with the interior surface of the top portion abutting the outer wall and the side portion positioned along and covering the exposed edge; and optionally an attachment means attached to the interior surface of the gasket.

19. The seal of claim 18, wherein the gasket has a bottom portion that is substantially parallel to the top portion with the side portion being located between the top and bottom portions, the three portions cooperating to define an exterior surface and an interior surface, and the interior surface of the bottom portion abutting the inner wall.

20. The seal of claim 18, wherein the gasket has a generally L-shaped cross-section.

21. The seal of claim 18, wherein the two portions are disposed at approximately a right angle relative to each other when the gasket is viewed in cross-section.

22. The seal of claim 18, wherein the side portion is arced.

23. The seal of claim 19, wherein the top portion and the side portion are disposed at approximately a right angle relative to each other and the bottom potion is disposed at approximately a right angle relative to the side portion.

24. The seal of claim 19, wherein the side portion is arced.

25. The seal of claim 19, wherein the gasket when viewed in cross-section is J-shaped or U-shaped.

26. The seal of claim 18 or claim 19, wherein the gasket further comprises an attachment means, the attachment means being an adhesive applied to or an adhesive strip attached to the interior surface of the gasket.

27. The seal of claim 18 or claim 19, wherein the seal is affixed to the access opening with an adhesive, an adhesive strip or a mechanical fastener.

28. The seal of claim 18 or claim 19, wherein the gasket is formed of a polymeric material.

29. The seal of claim 18 or claim 19, wherein the gasket is formed of a polymeric material having a durometer ranging between 30–80.

30. The seal of claim 18 or claim 19, wherein the gasket if formed of ethylene propylene diene methylene terpolymer having a durometer ranging between 30–80.

31. The watercraft of claim 1, wherein the storage compartment is removable.

32. The seal of claim 18, wherein the storage compartment is removable.

* * * * *